United States Patent [19]
Maddox et al.

[11] Patent Number: 5,685,397
[45] Date of Patent: Nov. 11, 1997

[54] WHEEL CHOCK FOR CHOCKING RAILROAD CAR WHEEL

[75] Inventors: Wilson Maddox; Billy Cobb, both of Waverly, Tenn.

[73] Assignee: Central Sales and Service Inc., Waverly, Tenn.

[21] Appl. No.: 546,280

[22] Filed: Oct. 20, 1995

[51] Int. Cl.$^6$ ................................................. B61H 13/00
[52] U.S. Cl. ........................ 188/36; 188/32; 294/15; 294/17; 294/19.1
[58] Field of Search .................... 188/36, 32; 294/22, 294/19.1, 15, 17

[56] References Cited

U.S. PATENT DOCUMENTS

| | | | |
|---|---|---|---|
| 2,655,399 | 10/1953 | McMillan | 294/17 |
| 2,918,236 | 12/1959 | Cochran | 188/36 |
| 3,120,292 | 2/1964 | Rambat | 188/32 |
| 3,837,622 | 9/1974 | Gale | 294/15 |

FOREIGN PATENT DOCUMENTS

| | | | |
|---|---|---|---|
| 0853340 | 10/1952 | Germany | 294/19.1 |
| 2618799 | 11/1977 | Germany | 188/36 |

Primary Examiner—Matthew C. Graham
Attorney, Agent, or Firm—Stephen T. Belsheim

[57] ABSTRACT

A wheel chock assembly for chocking the wheel of a railroad car including a chock having at least one inclined ramp surface, a bottom surface, and opposite side surfaces. Each one of the opposite side surfaces of the chock contains a bore. A positioner presents an elongate arm with a retriever at one end thereof. The retriever has a projection which is receivable within a selected one of the bores in the opposite side surfaces. When the projection engages a selected one of the bores, the positioner can carry the chock for the selective positioning of the chock.

10 Claims, 2 Drawing Sheets

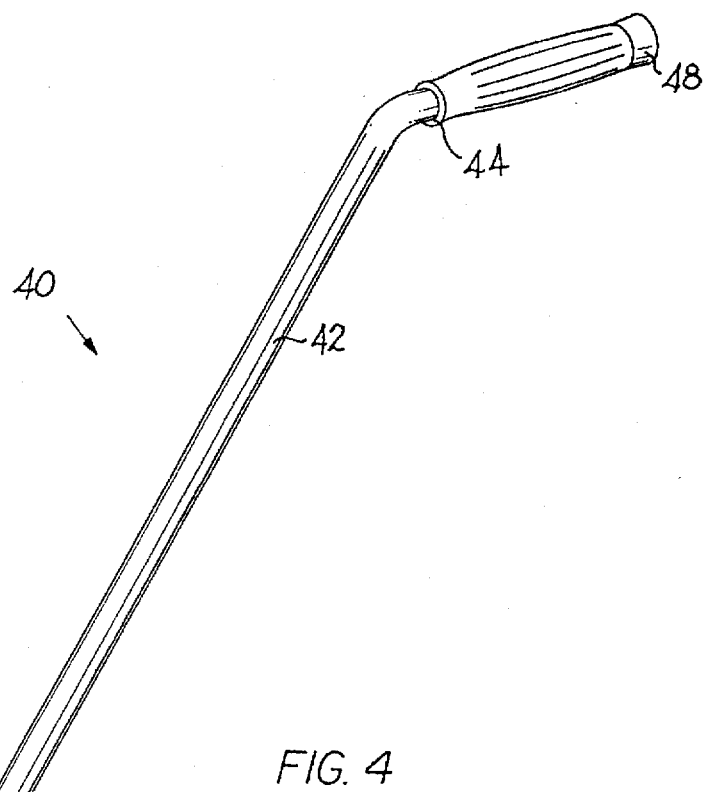
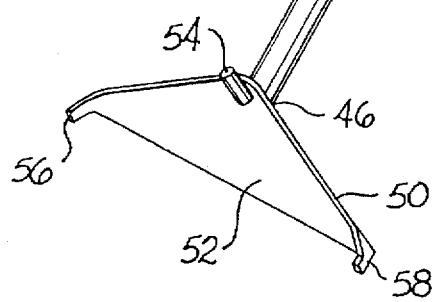
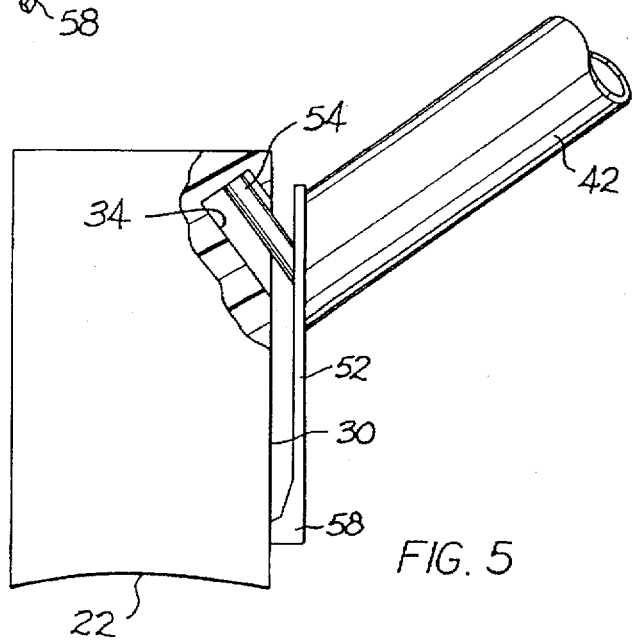
FIG. 4
FIG. 5

WHEEL CHOCK FOR CHOCKING RAILROAD CAR WHEEL

BACKGROUND OF THE INVENTION

The invention pertains to chocks for chocking the wheels of a vehicle to prevent the vehicle from rolling in the direction of the chock. More specifically, the invention pertains to chocks for chocking the wheels of a railroad car to prevent the railroad car from rolling along the railroad track in the direction of the chock.

In railroad yards, it is necessary to secure a railroad car so that it will not roll along the track in a particular direction. Typically, this has been done by placing a chock behind the wheel of the railroad car so as to prevent the railroad car from rolling along the track in the direction of the chock.

In order to position the chock, the workman has had to stand behind the railroad car, and bend down so as to manually position the chock by hand. While this has been a satisfactory way to position a chock, there are attendant dangers associated with this method.

The primary danger is that while the workman is directly behind the railroad car, the car may move toward the workman. If the workman cannot get out the way fast enough, the car may strike the workman thereby causing injury.

It would highly desirable to provide an improved chock for chocking the wheels of a railroad car.

It would also be highly desirable to provide an improved chock for chocking the wheels of a railroad car wherein the workman does not have to stand behind the railroad car.

SUMMARY OF THE INVENTION

It is a principal object of the invention to provide an improved chock for chocking the wheels of a railroad car.

It is another object of the invention to provide an improved chock for chocking the wheels of a railroad car wherein the workman does not have to stand behind the railroad car while he positions the chock behind the wheels.

In one form thereof, the invention is a wheel chock assembly for chocking the wheel of a railroad car wherein the assembly comprises a chock that has at least one inclined ramp surface, a bottom surface, and opposite side surfaces. Each one of the opposite side surfaces of the chock contains a bore. A positioner comprises an elongate arm having a retriever at one end thereof. The retriever has a projection which is receivable within a selected one of the bores in the opposite side surfaces. When the projection engages a selected one of the bores the positioner can carry the chock for the selective positioning of the chock.

BRIEF DESCRIPTION OF THE DRAWINGS

The following drawings form a part of this patent application, and a brief description of these drawings is set forth below:

FIG. 4 is a perspective view of a positioner which receives the chock and can carry and thereby position the same; and FIG. 5 is a side view with a portion of the chock broken away and a portion of the positioner removed whereby the connection between the positioner and the chock is depicted.

DETAILED DESCRIPTION OF A SPECIFIC EMBODIMENT

Figure 1:
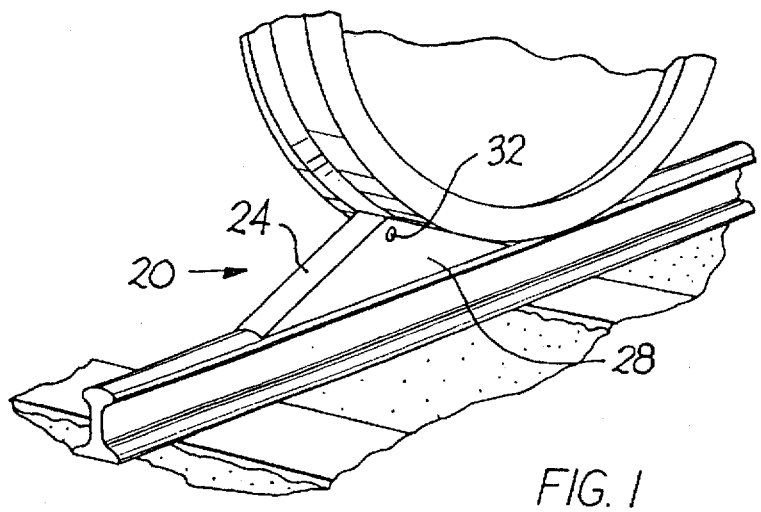
FIG. 1 is a perspective view of the chock positioned behind a wheel of a railroad car wherein the wheel is partially shown resting on the track.
Figure 2:
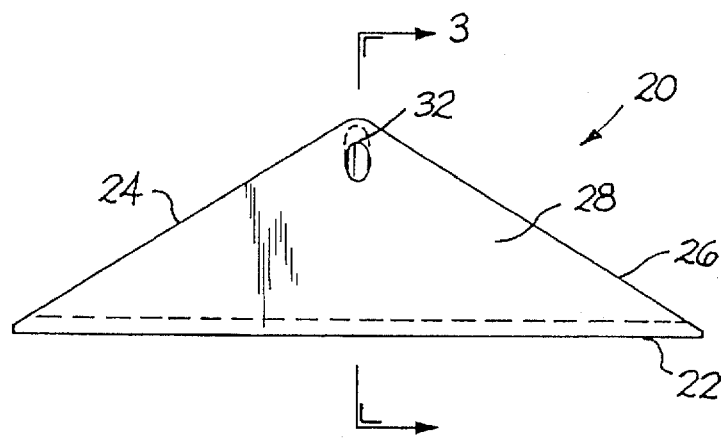
FIG. 2 is a side view of the chock of FIG. 1.
Figure 3:
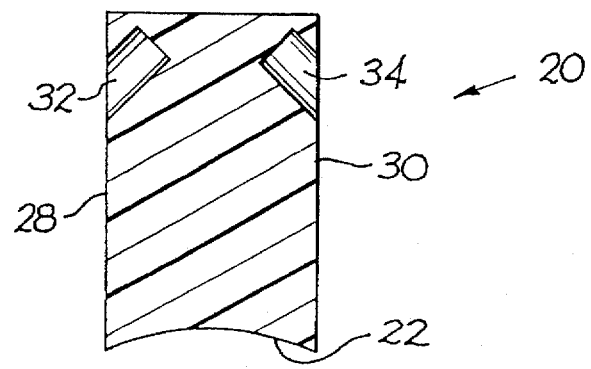
FIG. 3 is a cross-sectional view of the chock of FIG. 2 taken along section line 3—3.

Referring to the drawings, the chock, which carries a general designation of 20, is of a generally triangular shape. Chock 20 has an arcuate bottom surface 22, opposite inclined ramp surfaces 24, 26, and opposite side surfaces 28 and 30. Each one of the side surfaces 28, 30 includes an inclined bore 32 and 34, respectively. The chock is preferable made from polyurethane, safety orange 94 durometer.

The positioner, which carries a general designation of 40, includes an arm 42 with opposite ends 44 and 46. At end 44 is a handle 48. At end 46 is a receiver 50. Receiver 50 comprises a generally triangular plate 52 which has a projection 54 extending therefrom. The plate 50 further includes a pair of opposition fingers 56 and 58 which extend from the distal corners of the plate.

In operation, the workman takes the positioner so as to position the projection of the positioner within a selected one of the bores. The workman can then position the chock behind the wheel of the car without actually being behind the car. Instead, the workman is to the side of the car. Thus, this reduces the chance that the workman will be injured in the case of the car accidently rolling toward the workman.

To remove the chock, the workman again stands to the side of the car and track, and positions the receiver so that the projection is within the bore. The workman can then lift the chock out of the way so that the car is free to roll.

Other embodiments of the invention will be apparent to those skilled in the art from a consideration of the specification or practice of the invention disclosed herein. It is intended that the specification and examples be considered as illustrative only, with the true scope and spirit of the invention being indicated by the following claims.

What is claimed is:

1. A wheel chock assembly for chocking the wheel of a railroad car by an operator wherein the railroad car rides on a rail, the assembly comprising:

a discrete chock having a pair of inclined ramp surfaces that intersect at an apex, the chock having a bottom surface, and opposite side surfaces, each one of the opposite side surfaces of the chock containing a bore, and each one of the bores is inclined upwardly toward the apex; and a discrete positioner comprising an elongate arm having a retriever at one end thereof, the retriever having a projection which is receivable within the bore in a selected one of the opposite side surfaces, when the projection engages the bore in the selected one of the side surfaces the positioner projects away from the selected side surface so that the positioner can carry the chock for the selective positioning of the chock in such a fashion that the elongate arm is generally perpendicular to the rail on which the railroad car rides.

2. The wheel chock assembly of claim 1 wherein when the chock is in an operative position, the bottom surface of the chock rests on the surface of the rail on which the railroad car rides.

3. The wheel chock assembly of claim 1 wherein when the chock is in an operative position, a selected one of the ramp surfaces of the chock engages the wheel of the railroad car.

4. The wheel chock assembly of claim 1 wherein the bottom surface of the chock is arcuate.

5. The wheel chock assembly of claim 4 wherein when the chock is in an operative position, at least a portion the arcuate bottom surface of the chock rests on the surface of the rail on which the railroad car rides.

6. The wheel chock assembly of claim 1 wherein the chock is made of polyurethane.

7. The wheel chock assembly of claim 1 wherein the positioner detachably carries the chock.

8. The wheel chock assembly of claim 1 wherein the projection on the positioner is inclined.

9. The wheel chock assembly of claim 1 wherein the retriever includes a pair of fingers, and wherein the fingers rest against the selected one of the side surfaces when the projection engages the bore in the selected one of the side surfaces.

10. A wheel chock assembly for the chocking by an operator of the wheel of a railroad car which rides on a rail, the assembly comprising:

a chock having at least one inclined ramp surface, the chock having a bottom surface, and opposite side surfaces, each one of the opposite side surfaces of the chock containing a bore, each one of the bores inclining upwardly away from the bottom surface; and a positioner comprising an elongate arm having a retriever at one end thereof, the retriever having a projection which is receivable within the bore of a selected one of the opposite side surfaces, when the projection engages the bore in the selected side surface the elongate arm of the positioner projects away from the selected side surface so that during the positioning of the chock on the rail the elongate arm extends away from the rail, and wherein when the projection engages the bore in the selected side surface the elongate arm of the positioner projects away from the selected side surface so as to be generally perpendicular to the selected side surface.

* * * * *